Nov. 3, 1953     J. D. FANN     2,657,572

VISCOSITY MEASURING DEVICE

Filed May 19, 1947

JAMES D. FANN
INVENTOR.

BY *Lester B. Clark*
*Ray L. Smith*

ATTORNEYS

Patented Nov. 3, 1953

2,657,572

UNITED STATES PATENT OFFICE 2,657,572

VISCOSITY MEASURING DEVICE

James D. Fann, Houston, Tex.

Application May 19, 1947, Serial No. 748,925

9 Claims. (Cl. 73—59)

1

The present invention relates to a device for measuring various characteristics of fluid such as viscosity, gel strength, and the like.

An object of the present invention is to provide a device for measuring a characteristic of a fluid by determining the drag upon a revolving member immersed therein.

Another object of the invention is to provide a device for measuring characteristics of fluids by measuring the force required to maintain a coupling between a drive shaft and a driven rotor immersed in the fluid.

Still another object of the invention is to provide a device for measuring the characteristics of a fluid by noting the angular displacement of a coupling means due to the resisting torque produced by the drag of the fluid on a rotating member which is driven in the fluid through the coupling means.

A further object of the invention is to provide a device for measuring characteristics of a fluid including means for indicating an effect, said means being associated with a moving element, the strength of which is a factor affecting the response thereof.

A still further object is to provide a device for measuring characteristics such as viscosity, gel strength and the like which device is provided with a rotor immersed in the fluid and releasably coupled to a drive shaft, the coupling strength being arranged to vary to indicate the characteristic desired of the fluid.

Still a further object is to provide a device for measuring various characteristics of fluid which is simple and accurate in operation, and which is capable of continuously determining the characteristics of a fluid.

Other and further objects and advantages will become apparent with a consideration of the following description and drawings, wherein.

2

Figure 1:
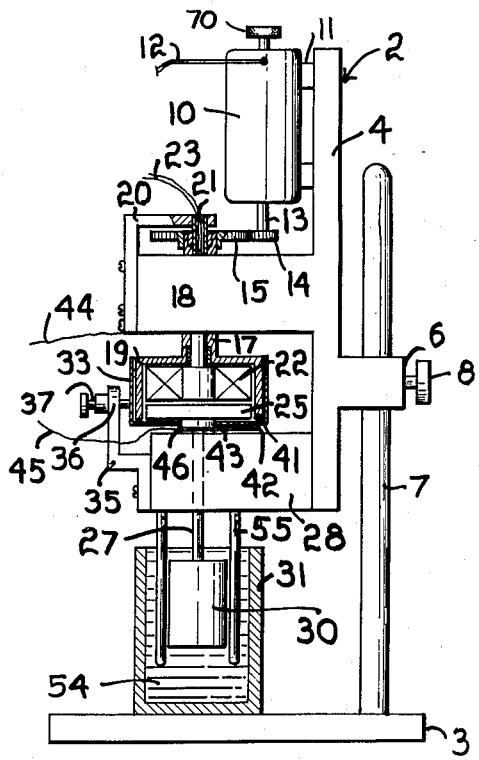
Fig. 1 is a vertical elevation partially in section showing one form of the invention.

In Fig. 1 the device is shown generally at 2 as being supported upon a stand 3 by means of the frame 4 which is provided with an arm 6 adapted to slidably fit the upright 7 of the stand 3. A clamping screw 8 is provided in this arm 6 so that the frame 4 may be positioned at the desired elevation along the upright 7.

Adjacent the upper part of the frame 4 a motor 10 is secured thereto by suitable means such as the braces 11. A source of power such as a storage battery (not shown) or other suitable means is connected to the power lead 12 to supply the motor 10 with electrical energy. The shaft 13 extending downwardly from the motor 10 is provided with a pinion 14 adjacent the lower end thereof, which meshes with gear 15 connected to the shaft 17 which extends downwardly through the portion 18 of the frame 4 and is provided with an annular cup shaped member 19 on the lower end thereof.

Extending upwardly from the portion 18 of the frame 4 is a brace 20 to which is fixed the hollow shaft 21 which is concentric with the gear 15. The hollow shaft 21 extends downwardly through the shaft 17 and supports within the cup shaped member 19 a stationary coil 22. Suitable power leads such as at 23 extend upwardly from the coil 22 and through the hollow shaft 21 to a suitable source of power. Inwardly and closely adjacent the lower end of the coil 22 is an elongated or other suitably shaped pole piece 25 which is connected to the shaft 27 extending downwardly through the portion 28 of the frame 4 and is provided at its lower end with a member 30 adapted to fit into the container 31. In the form of a coupling shown in Fig. 2, extending upwardly and about the cup shaped member 19 is a cofitting cup shaped member 33 which is connected to the shaft 27 and the pole piece 25. Adjacent the portion 28 and extending upwardly therefrom is a brace bar 35 which is provided at its upper end 36 adjacent the cofitting cup member 33 with a screw 37 therethrough which is adapted to engage the cup shaped member 33 as will be more fully described hereinafter.

Extending downwardly from the cup shaped member 19 through a slot 40 in the bottom 41 of the cofitting cup 33 is a pin 42 arranged to engage contact 43 upon relative rotation of the cup shaped members 19 and 33. A pair of leads 44 and 45, one of which is connected at 46 to the contact 43, is provided so as to be engaged with a suitable indicator such as a light or recording means.

Figure 2:
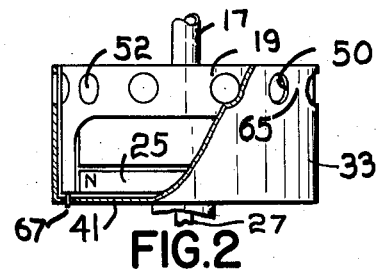
Fig. 2 is a vertical elevation partially in section showing a modification of the coupling means between the drive shaft and the driven rotor.

In Fig. 2, adjacent the upper end of the cup shaped member 33, is a plurality of holes 50 aligned about the periphery thereof. The marks 52 on the outer periphery of the cup shaped member 19 are arranged at the same height as the holes 50 through the cup shaped member 33.

In the operation of the device, a container 31, containing a fluid 54 which is to be tested for various characteristics such as viscosity, or the like, is placed upon the stand 3. The member 30 on the shaft 27 is lowered downwardly into the container by adjusting the position of the frame 4 on the upright 7 by means of the adjustable screw 8.

Adjacent the member 30 is a plurality of downwardly extending arms 55 arranged to fit in close proximity with the member 30 so that during rotation thereof the turbulence of the fluid 54 will be retained at a minimum so as to attain the highest degree of accuracy. The motor 10 is connected through the power leads 12 to a suitable source of power and the rotation thereof is imparted through the gears 14 and 15 to the cup shaped member 19. A contact 42 will engage in the end of the slot 40 and cause the cup shaped member 33, the shaft 27, and the member 30 to rotate in synchronism with the shaft 17. A suitable source of power may then be applied through the leads 23 to the coil 22 which energizes the cup shaped member 19 and the adjacent pole piece 25. This then pulls the two pole pieces 25 and the magnetized cup member 19 into alignment. The supply of current through the leads 23 to the coil 22 may be gradually reduced until the torque exerted by the fluid against the rotating member 30 causes the pole piece 25 to pull out of alignment with the magnetized cup member 19. At this instant, the contact 42 will rotate about 30 degrees due to the lag between the two pole pieces and will touch the contact 43. The two leads 44 and 45 which are connected to suitable recording means will then indicate to the operator that the two pole pieces have slipped out of alignment.

The operator, by noting the reading on the ammeter 60 which is calibrated in suitable viscosity and gel strength units, determines the viscosity or gel strength directly, depending upon which measurement is being made.

Figure 4:
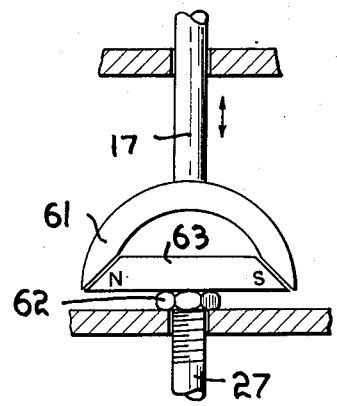
Fig. 4 is a vertical sectional view partially in elevation of another modification of the coupling means wherein a permanent magnet is used.

In Fig. 4, the drive shaft 17 has connected a permanent magnet 61 at the lower end thereof.

The shaft 27 is connected at 62 to a second permanent magnet 63 adjacent the permanent magnet 61 affixed on the shaft 17. This device may be used where it is desirable to attain a specified characteristic in a fluid. That is to say, that since the magnets 61 and 63 are not variable in their strength, a certain definite strength is attained between the drive shaft 17 and the driven shaft 27. A fluid 54 in the container 30 may then be used in conjunction with this construction so that by adding various constituents to the fluid 54 until relative rotation is imparted between the magnets 61 and 63, an indication is obtained showing that the specified characteristic has been attained in the fluid. Alternately, the instrument may be used to determine whether viscosity or other characteristic of the fluid is above or below a predetermined value which is dependent upon physical dimensions, magnet strength, or air gap adjustment in the device.

The motor 10 may be provided with a suitable governor so that a consistent speed of rotation is imparted to the shaft 13 and to the shaft 27 during the test. The construction may be of any suitable material and can be of any suitable size so that it may be readily transported from location to location during its use.

In order to use the full scale of meter 60 to indicate the characteristic being measured, the meter 60 is shunted by a source of electrical energy such as battery 64 and a variable resistor 65. The resistor 65 is adjusted until meter 60 reads zero, when the device is in operation and member 30 is rotating in air. Thereafter, obviously meter 60 will indicate the current required to overcome resistance due to viscosity of the fluid 54 in which member 30 is rotating. In other words, this construction permits use of entire scale of meter 60 for the measurement being made.

An alternative method of indicating to the operator when the pole pieces 25 and 19 have been pulled out of alignment by the torque exerted against the rotating member is the holes 50 and the aligned marks 52 as shown in Fig. 2. At the beginning of the operation, the holes and the marks will be aligned so that a definite color will be noticed as the two rotate. Relative movement between the member 19 and the co-fitting member 33 will cause the marks 52 to move out of alignment with the holes 50 whereby the color formerly observed by the operator will be blotted out by the space 65 between the holes 50, and the stop pin 67 will engage one end of the slot 40 in the member 33 whereby the members 19 and 33 will thereafter rotate in unison, but angularly displaced from their relative positions. The reading of the meter 60 when the marks 52 and the holes 50 fall out of alignment gives the viscosity reading of the fluid being tested. It seems obvious that the unit may be used by noting the reading of the meter when the marks 52 and holes 50 are pulled into aligned position from a non-aligned starting position.

Figure 3:
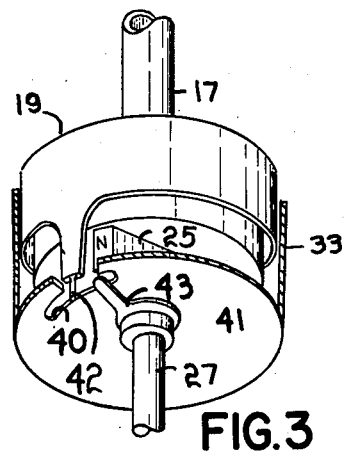
Fig. 3 is a perspective view showing a detail construction of the coupling means shown in Fig. 1.
Figure 5:
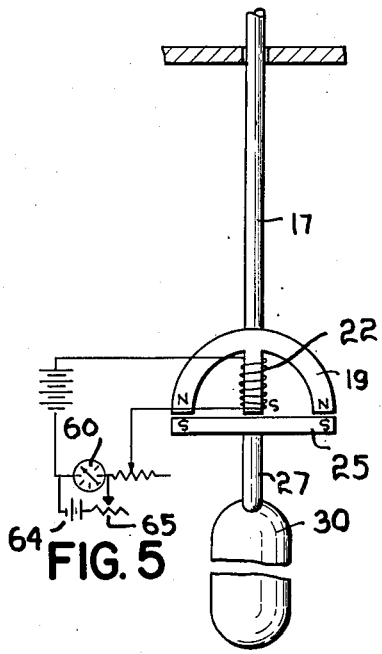
Fig. 5 is a diagrammatic view of the coupling means along with the drive shaft and the driven rotor and the circuit for varying the strength of the coupling means.

To take gel strength measurements, a knob 70 on the upper end of the shaft 13 is provided so that rotation may be imparted to the member 19 by hand rotation of the shaft 13 to pull the member 19 and co-fitting member 33 out of alignment. The screw 37 is positioned inwardly against the member 33 during the relative rotation of the cofitting members 19 and 33. After the two are moved out of alignment, the screw brake 37 is then released from engagement with the member 33. Current is then supplied to the coil 22 which energizes the member 19 and pole piece 25. The current is gradually increased until the members 19 and 33 are pulled into alignment which can be noted by the pin 42 engaging control 43 (Fig. 3) or by the holes 50 and marks 52 being aligned (Fig. 2). The current reading on meter 60 is calibrated into any suitable units and the reading at the time that the two members 19 and 33 are in alignment is the gel strength of the material being tested.

Of course each material tested is subjected to the same conditions before testing such as being stirred a certain amount of time, allowing each material to set or gel the same amount of time before stirring, and the like.

Broadly the invention contemplates a device for measuring various characteristics of a fluid such as viscosity, gel strength, and the like.

What is claimed is:

1. A device for measuring the flow properties of fluids comprising a rotatable member arranged to be driven in contact with the fluid to be tested, a drive shaft attached to said member, a driving means for said shaft, a displaceable magnetic coupling means disposed between one end of said shaft and said driving means, said coupling means being horizontally displaceable in proportion to the resisting torque produced by the drag on the rotatable member by the fluid being measured and means to indicate displacement of said coupling means.

2. A device for measuring the flow properties of fluids comprising a rotatable member arranged to be driven in contact with the fluid to be tested, a drive shaft attached to said member, a driving means for said shaft, a displaceable magnetic coupling means disposed between one end of said shaft and said driving means, said coupling means being displaceable in proportion to the resisting torque produced by the drag on the rotatable member by the fluid being measured, and means actuated when the coupling is displaced to indicate that said coupling has been displaced.

3. A device for measuring the flow properties of fluids comprising a rotatable member arranged to be driven in contact with the fluid to be tested, a drive shaft attached to said member, a driving means for said shaft, a displaceable magnetic coupling means disposed between one end of said shaft and said driving means, said coupling means including a coil to receive electrical energy to vary the strength of said coupling means, said coupling means being displaceable when the resisting torque produced by the drag of the fluid being measured on the rotatable member becomes greater than the strength of said coupling means, and means for measuring the displacement of the coupling means.

4. A device for measuring the flow properties of fluids comprising a rotatable member arranged to be driven in contact with the fluid to be tested, a drive shaft attached to said member, a driving means for said shaft, a displaceable magnetic coupling means disposed between one end of said shaft and said driving means, said coupling means including a coil to receive electrical energy to vary the strength of said coupling means, said coupling means being horizontally displaceable when the resisting torque produced by the drag of the fluid being measured on the rotatable member becomes greater than the strength of said coupling means, and means for measuring the displacement of said coupling means, such measurement being indicative of the flow properties of the fluid.

5. In a device for measuring the flow properties of fluids, a rotatable member arranged to be driven in contact with the fluid to be tested, a drive shaft attached to said member, a driving means for said shaft, a variable strength displaceable magnet coupling means disposed between one end of said shaft and said driving means, means associated with said coupling means to vary the strength of said coupling means, said means including a coil, said coil including leads connected thereto to receive and supply electrical energy to said coil, said driving shaft arranged to be rotatably displaced when the resisting torque produced by the drag of the fluid on the rotatable member becomes equal to and greater than the strength of the coupling means, and means to indicate the displacement of said driving shaft.

6. A device for indicating characteristics of fluids including, a drive shaft, means to drive said shaft, a rotatable member to be driven by said shaft and immersed in the fluid being tested, one portion of a displaceable magnetic coupling fixed to said shaft, the other portion of a displaceable magnetic coupling connected to said member and aligned with said coupling portion on said shaft to drive said rotatable member through said magnetic coupling portions when said drive means rotates said shaft, said magnetic coupling portions on said shaft and on said member becoming displaced relative to each other when the resisting torque produced by the drag of the fluid on said member immersed therein exceeds the strength of said magnetic coupling portions, and means to measure the relative displacement of the magnetic coupling portions.

7. In a measuring device including indicating means to indicate an effect, a moving element, a displaceable coupling connected between said element and said indicating means, the strength of which coupling is a factor influencing the response of said indicating means proportional to the displacement of said coupling, means for driving said element at a constant speed, and electromagnetic means for varying the strength of said coupling.

8. A device for indicating and measuring characteristics of a fluid comprising, a drive shaft, a rotatable member to be driven by said shaft in contact with the fluid to be tested, a driving means for said shaft, a displaceable magnetic coupling means connecting said shaft and said member, said coupling means being displaceable by the resisting torque produced by the drag on the rotatable member by the fluid being measured, and means for measuring the displacement of said coupling means as an indication of the characteristics of the fluid being tested.

9. In a device for measuring the flow properties of fluids, a rotatable member arranged to be driven in contact with the fluid to be tested, a drive shaft attached to said member, a driving means for said shaft, a variable strength coupling means comprising, electromagnetically engaged portions connected respectively to one end of said shaft and to said driving means, said portions being relatively displaceable angularly when the torque produced by the drag of the fluid on the rotatable member exceeds the strength of engagement of the portions, the portion connected to said driving means including a coil electrically energizable to vary the strength of said coupling means, and means for measuring the relative displacement of said portions.

JAMES D. FANN.

References Cited in the file of this patent

UNITED STATES PATENTS

| Number | Name | Date |
|---|---|---|
| 454,832 | Bennett et al. | June 23, 1891 |
| 1,962,070 | Granat | June 5, 1934 |
| 2,330,991 | Newton | Oct. 5, 1943 |
| 2,354,299 | Bays | July 25, 1944 |
| 2,360,546 | Cardwell | Oct. 17, 1944 |

FOREIGN PATENTS

| Number | Country | Date |
|---|---|---|
| 282,463 | Italy | Feb. 12, 1931 |
| 533,524 | Germany | Sept. 15, 1931 |